US011134487B2

(12) United States Patent
Samdanis et al.

(10) Patent No.: US 11,134,487 B2
(45) Date of Patent: Sep. 28, 2021

(54) SDN-BASED METHODS AND APPARATUSES FOR PROVIDING TDD RADIO ACCESS NETWORK SERVICES

(71) Applicant: NEC Laboratories Europe GmbH, Heidelberg (DE)

(72) Inventors: Konstantinos Samdanis, Munich (DE); Rudraksh Shrivastava, Stuttgart (DE); Xavier Costa-Perez, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 8 days.

(21) Appl. No.: 16/093,166

(22) PCT Filed: Mar. 31, 2016

(86) PCT No.: PCT/GB2016/050914
§ 371 (c)(1),
(2) Date: Oct. 12, 2018

(87) PCT Pub. No.: WO2017/168112
PCT Pub. Date: Oct. 5, 2017

(65) Prior Publication Data
US 2019/0174498 A1 Jun. 6, 2019

(51) Int. Cl.
*H04W 72/04* (2009.01)
*H04W 16/10* (2009.01)
*H04L 5/14* (2006.01)
*H04L 12/24* (2006.01)
*H04W 24/02* (2009.01)

(52) U.S. Cl.
CPC .......... *H04W 72/0453* (2013.01); *H04L 5/14* (2013.01); *H04W 16/10* (2013.01); *H04L 41/0803* (2013.01); *H04W 24/02* (2013.01)

(58) Field of Classification Search
None
See application file for complete search history.

(56) References Cited

U.S. PATENT DOCUMENTS 9,775,045 B2 * 9/2017 Li ................... H04W 16/02
10,348,394 B1 * 7/2019 Bakr .............. H04B 7/0408
(Continued)

FOREIGN PATENT DOCUMENTS

WO       2016/036111 A1      3/2016

OTHER PUBLICATIONS

Samdanis K et al: "TD-LTE virtual cells: An SDN architecture for user-centric multi-eNB elastic resource management", Computer Communications, Elsevier Science Publishers BV, Amsterdam, NL, vol. 83, Jan. 8, 2016 (Jan. 8, 2016), pp. 1-15, XP029505747.

(Continued)

*Primary Examiner* — Andrew C Oh
(74) *Attorney, Agent, or Firm* — Leydig, Voit & Mayer, Ltd.

(57) ABSTRACT

A communication apparatus for facilitating setting up of a network slice for service provision in a time division duplex system includes a receiver configured to receive a request for a network slice for at least one service. A processor is configured to specify, for the requested network slice, at least one of an uplink/downlink (UL/DL) configuration and a reconfiguration timescale. A transmitter is configured to notify at least one of a communication entity of a radio access network and a communication entity of a core network of the UL/DL configuration.

18 Claims, 7 Drawing Sheets

(56) References Cited

U.S. PATENT DOCUMENTS

| | | | | |
|---|---|---|---|---|
| 2005/0059408 A1* | 3/2005 | Tiedemann, Jr. | ..... | H04W 28/08 455/452.1 |
| 2005/0088992 A1* | 4/2005 | Bolin | ................ | H04W 88/085 370/329 |
| 2008/0304448 A1* | 12/2008 | Hosein | ................ | H04W 72/08 370/329 |
| 2009/0143064 A1* | 6/2009 | Bernini | ................ | H04W 16/18 455/423 |
| 2009/0161617 A1* | 6/2009 | Abedi | ................ | H04W 16/10 370/329 |
| 2011/0296440 A1* | 12/2011 | Laurich | ................ | G06F 21/72 719/326 |
| 2012/0014332 A1* | 1/2012 | Smith | ................ | H04M 15/60 370/329 |
| 2012/0157106 A1* | 6/2012 | Wang | ................ | H04W 24/08 455/446 |
| 2013/0005378 A1* | 1/2013 | Hasegawa | ............. | H04W 16/06 455/509 |
| 2013/0040679 A1* | 2/2013 | Kashiwase | ............ | H04W 72/04 455/509 |
| 2013/0259465 A1* | 10/2013 | Blair | ................ | H04Q 11/0067 398/2 |
| 2013/0303114 A1 | 11/2013 | Ahmad et al. | | |
| 2014/0056243 A1* | 2/2014 | Pelletier | ............ | H04W 72/1263 370/329 |
| 2014/0204924 A1* | 7/2014 | Ryu | ................... | H04W 40/246 370/338 |
| 2014/0219162 A1* | 8/2014 | Eyuboglu | ............... | H04L 69/28 370/315 |
| 2014/0269547 A1* | 9/2014 | Valliappan | ............ | H04W 16/02 370/329 |
| 2014/0274064 A1* | 9/2014 | Al-Shalash | ....... | H04W 36/0009 455/437 |
| 2015/0016371 A1* | 1/2015 | Lee | ...................... | H04L 5/0035 370/329 |
| 2015/0141025 A1* | 5/2015 | Larsson | ............. | H04W 84/005 455/448 |
| 2015/0143456 A1* | 5/2015 | Raleigh | ............... | H04W 12/088 726/1 |
| 2015/0149656 A1* | 5/2015 | McMurry | ............... | H04L 45/42 709/238 |
| 2015/0230234 A1* | 8/2015 | Choi | .................... | H04B 7/0417 370/329 |
| 2015/0282155 A1* | 10/2015 | Webb | ................ | H04W 72/0453 370/329 |
| 2015/0373626 A1* | 12/2015 | Yi | ........................ | H04W 24/08 375/132 |
| 2016/0028586 A1* | 1/2016 | Blair | ................. | H04L 41/0826 398/45 |
| 2016/0037550 A1* | 2/2016 | Barabell | ............ | H04W 72/046 455/450 |
| 2016/0050608 A1* | 2/2016 | Fan | ...................... | H04W 92/20 370/280 |
| 2016/0057234 A1* | 2/2016 | Parikh | .................... | H04L 67/16 709/226 |
| 2016/0073278 A1* | 3/2016 | Roessler | ................. | H04L 45/64 370/252 |
| 2016/0142427 A1* | 5/2016 | de los Reyes | ...... | H04L 63/1441 726/23 |
| 2016/0192238 A1* | 6/2016 | Papadopoulos | ....... | H04W 28/08 370/235 |
| 2016/0234078 A1* | 8/2016 | Jana | ........................ | H04L 47/25 |
| 2016/0270053 A1* | 9/2016 | Zeng | ..................... | H04W 28/26 |
| 2017/0013598 A1* | 1/2017 | Jung | ........................ | H04W 72/02 |
| 2017/0079059 A1* | 3/2017 | Li | ........................ | H04W 16/02 |
| 2017/0257870 A1* | 9/2017 | Farmanbar | ............ | H04W 24/02 |
| 2017/0280467 A1* | 9/2017 | Zhu | ..................... | H04W 72/085 |
| 2017/0311172 A1* | 10/2017 | Van Phan | ............. | H04W 16/14 |
| 2017/0311339 A1* | 10/2017 | Xu | ........................ | H04W 72/08 |
| 2018/0368140 A1* | 12/2018 | Centonza | .......... | H04W 72/0426 |

OTHER PUBLICATIONS

Shrivastava R et al: "An SDN-based framework for elastic resource sharing in integrated FDD/TDD LTE-A HetNets", 2014 IEEE 3rd International Conference on Cloud Networking (Cloudnet), IEEE, Oct. 8, 2014 (Oct. 8, 2014), pp. 126-131, XP032692368.

Salvatore Constanzo et al: "An SDN-based virtual cell framework for enhancing the QoE in TD-LTE pico cells", 2015 Seventh International Workshop on Quality of Multimedia Experience (QOMEX), May 1, 2015 (May 1, 2015), pp. 1-6, XP055321481.

Jingchu Liu et al: "On the statistical multiplexing gain of virtual base station pools", 2014 IEEE Global Communications Conference, Dec. 1, 2014 (Dec. 1, 2014), pp. 2283-2288, XP055321194.

3GPP TS 36.300 V13.1.0 (Sep. 2015), "$3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)", Sep. 2015, pp. 1-254.

3GPP TS 23.203 V13.6.0 (Dec. 2015), "$3^{rd}$ Generation Partnership Project; Technical Specification Group Services and System Aspects; Policy and charging control architecture (Release 13)", Dec. 2015, pp. 1-242.

3GPP TS 32.130 V13.0.0 (Jan. 2016), "$3^{rd}$Generation Partnership Project; Technical Specification Group Services and System Aspects; Telecommunications management; Network sharing; Concepts and requirements (Release 13)", Jan. 2016, pp. 1-15.

3GPP TS 23.251 V13.1.0 (Mar. 2015), "$3^{rd}$ Generation Partnership Project; Technical Specification Group Services and System Aspects; Network Sharing; Architecture and functional description (Release 13)", Mar. 2015, pp. 1-39.

* cited by examiner

SDN-BASED METHODS AND APPARATUSES FOR PROVIDING TDD RADIO ACCESS NETWORK SERVICES

CROSS-REFERENCE TO PRIOR APPLICATION

This application is a U.S. National Stage Application under 35 U.S.C. § 371 of International Application No. PCT/GB2016/050914 filed on Mar. 31, 2016. The International Application was published in English on Oct. 5, 2017 as WO 2017/168112 A1 under PCT Article 21(2).

FIELD

The present invention relates to a radio access network in a cellular or wireless telecommunications network, and particularly but not exclusively to sharing the radio access network between multiple operators. The invention has particular but not exclusive relevance to wireless telecommunications networks implemented according to various standards defined by the 3$^{rd}$ Generation Partnership Project (3GPP). For example, the invention has relevance to Long Term Evolution (LTE) networks, LTE Advanced (LTE-A) networks, related enhancements to and developments of LTE/LTE-A, and/or the like.

BACKGROUND

Radio Access Network (RAN) sharing deployment scenarios are known and methods and abilities to facilitate implementations of these scenarios have been introduced into the 3rd Generation Partnership Project (3GPP) standards since Release 5.

Traditionally, RAN sharing provides a way for network operators (service providers) to reduce their capital expenditure requirements and/or widen the area covered by a cellular communication service when setting up a wireless communications network. Rather than each operator having to provide their own base station and associated equipment for each cell of the network, an operator sharing the RAN of another operator is able to provide their service into areas served by the other operator without having to invest in their own base stations in that location.

Furthermore, by reducing the number of base stations that must be provided and operated, the on-going operating costs can be reduced for the sharing operators. Indeed, each base station may draw a large amount of electricity during operation, and therefore reducing the number of operating base stations may significantly reduce electrical power requirements and may therefore also be considered environmentally friendly.

Typically, sharing of RANs by operators has been a fixed long-term agreement in which each operator gets some access to the RAN of the other operator. RAN sharing is particularly advantageous in areas in which an operator has cell capacity that is underused, as this spare capacity can then be shared with no impact on the original operator's on-going service provision. Furthermore, RAN sharing may be useful in order to ensure that a service provided by an operator is able to reach a certain percentage of the population, which may be specified by license conditions in some countries, without requiring each operator to install expensive capacity in remote areas in which it is likely to be underutilized.

The term '5G' refers to an evolving communication technology that is expected to support a variety of applications and services such as Machine Type Communications (MTC), Internet of Things (IoT) communications, vehicular communications and autonomous cars, high resolution video streaming, smart city services, and/or the like. Accordingly, 5G technologies are expected to enable network access to vertical markets and support network (RAN) sharing for offering networking services to third parties and creating new business opportunities.

However, in order to support such applications and services, the mobile network operators must meet diverse, often conflicting requirements of these applications and need to handle high volumes of data traffic. Some of these applications may have relatively lenient Quality of Service/Quality of Experience (QoS/QoE) requirements, while some applications may have relatively stringent QoS/QoE requirements (e.g. high bandwidth and/or low latency).

As it would be expensive and infeasible to deploy dedicated network infrastructure for each service or application type, network virtualization and 'network slicing' are seen as flexible and cost effective ways to support and accommodate heterogeneous applications with diverse demands over a common network infrastructure. Such network slicing is described in, for example, the 'NGMN 5G White Paper' V1.0 by the Next Generation Mobile Networks (NGMN) Alliance. Effectively, a network slice is a logical network with respect to a particular SLA for a specific tenant.

Network sharing may be realised in Time Division Duplex (TDD) networks, for example, using service oriented resource management in a virtualized RAN environment. In such a scenario, base stations are assumed to support network virtualization assuring isolation of different network slices and corresponding participants by adopting, for example, a hypervisor or container paradigm or an equivalent mechanism that assures appropriate resource isolation. Virtualization allows the creation of dedicated network slices tailored to match the demands of vertical market players, Mobile Virtual Network Operators (MVNOs), and Over-The-Top (OTT) providers, which are commonly referred to as tenants.

3GPP Technical Specification (TS) 23.251 V13.1.0 specifies two fundamental 3GPP network sharing architectures:
  (i) a so-called Multi-Operator Core Network (MOCN), in which each operator has its own core network, but the operators share a RAN; and
  (ii) a so-called Gateway Core Network (GWCN), in which the operators share both a Mobility Management Entity (MME) and a RAN.

SUMMARY

In an embodiment, the present invention provides a communication apparatus for facilitating setting up of a network slice for service provision in a time division duplex system. A receiver is configured to receive a request for a network slice for at least one service. A processor is configured to specify, for the requested network slice, at least one of an uplink/downlink (UL/DL) configuration and a reconfiguration timescale. A transmitter is configured to notify at least one of a communication entity of a radio access network and a communication entity of a core network of the UL/DL configuration.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

The inventors have realised that network sharing and virtualisation may have an adverse effect on the overall performance of the shared RAN (or shared base station) due to loss of multiplexing gain, reduced frequency diversity and associated interference, especially when network slices have a different size across neighbouring base stations, which may introduce inter-slice interference.

Accordingly, preferred embodiments of the present invention aim to provide methods and apparatus which overcome or at least partially alleviate the above issues.

In one embodiment, the invention provides a (first) communication apparatus for facilitating setting up of a network slice for service provision (e.g. in a time division duplex, 'TDD', system), the communication apparatus comprising: a receiver configured to receive a request for a network slice for at least one service; a processor configured to specify, for the requested network slice, at least one of an uplink/downlink (UL/DL) configuration and a reconfiguration timescale; and a transmitter configured to notify at least one of a communication entity of a radio access network and a communication entity of a core network of the UL/DL configuration In another embodiment, the invention provides a (second) communication apparatus for facilitating setting up of a network slice for service provision (e.g. in a time division duplex, 'TDD', system), the communication apparatus comprising: a receiver configured to receive a request for configuration of a network slice, the request comprising information identifying an uplink/downlink (UL/DL) configuration specified for the network slice; and a processor configured to allocate at least one resource (e.g. a frequency resource such as a subcarrier) for the network slice.

Embodiments of the invention extend to corresponding systems, methods, and computer program products such as computer readable storage media having instructions stored thereon which are operable to program a programmable processor or system to carry out a method as described herein and/or to program a suitably adapted computer to provide the apparatus according to an embodiment.

Figure 1:
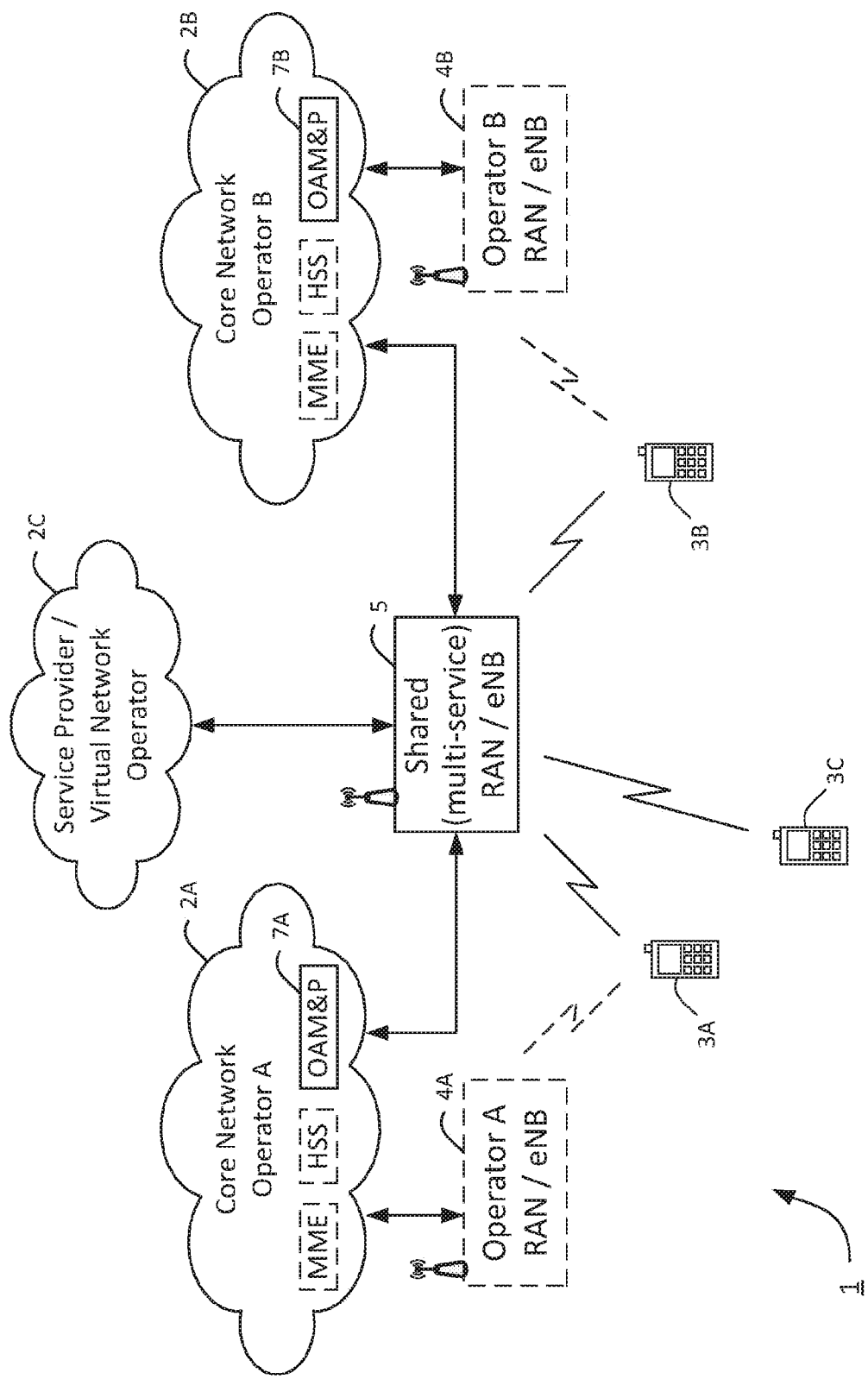
FIG. 1 schematically illustrates a mobile telecommunication system of a type to which embodiments of the invention is applicable.

FIG. 1 schematically illustrates a mobile (cellular) telecommunication system 1 in which network operators (denoted operators A and B) and/or other service providers (such as a virtual network operator 2C) are able to provide a mobile wireless communications service. Operator A has a core network 2A and operator B has a core network 2B. FIG. 1 shows a logical representation of the system, also depicting business relations between the different entities and shows each player's system components on a high level.

Each operator may also provide one or more base stations or eNBs 4A and 4B as part of an associated radio access network (RAN) for allowing user equipment, such as mobile telephones 3A, 3B, and 3C to connect to their network and receive the service. As will be understood by those skilled in the art, each base station 4 operates one or more base station cells in which communications can be made between the base stations 4 and the mobile telephones 3 using an appropriate radio access technology, for example, an Evolved Universal Terrestrial Radio Access (E-UTRA) technology and/or the like. For a base station associated with an operator, such as the eNB 4A associated with operator A, typically only mobile telephones 3A associated with the relevant operator are able to connect and interact with the wireless communication system via that base station 4A. Thus, only mobile telephones 3A configured to access services via service provider A are able to connect to the network via operator A's base station 4A (and only mobile telephones 3B configured to access services via service provider B are able to connect to the network via operator B's base station 4B) without "roaming" away from their home network.

The telecommunications system 1 further includes a shared RAN including at least one base station 5 (eNB 5), and the system may also support other tenants, such as a service provider/virtual network operator 2C (e.g. an MVNO, an OTT provider, and/or the like) via the shared base station 5. Such tenants may be coupled to the shared base station 5 via one of the core networks 2A, 2B. It will be appreciated that the interfaces shown in FIG. 1 between the Shared RAN and each one of 'Core Network Operator A', 'Core Network Operator B', and 'Virtual Network Operator' represent a logical relation between these entities (rather than actual physical connections). For example, it will be appreciated that a virtual operator, an OTT provider or a vertical service provider may not be able to connect to the shared RAN directly either because of (i) security restrictions and/or (ii) lack of network management infrastructure for the OTT/vertical service provider. Accordingly, it will be appreciated that the virtual network operator 2C (e.g. an MVNO, an OTT provider, and/or the like) will be connected to the shared base station 5 via an OAM (in this case OAM&P 7 of operator A or operator B).

Each core network 2A, 2B includes appropriate network management apparatus such as an Operations, Administration, Maintenance and Provisioning (OAM&P) entity 7. Although not necessarily shown in FIG. 1 for simplicity, each core network 2A, 2B may also include additional core network nodes, such as one or more MMEs, gateways, Home Subscriber Servers (HSSs), application servers, Service Capability Exposure Functions (SCEFs), Policy Control and Charging Rules Functions (PCRFs), and/or the like.

The shared base station 5 might be owned and operated by either operator A or B or owned and operated by a third party (e.g. a further network operator). Alternatively, the shared base station 5 might be jointly owned and operated by two or more operators. In any case, the operators A, B (and/or virtual network operator 2C) agree to share in the capacity of the shared base station 5 such that any of a mobile telephone 3A associated with operator A and a mobile telephone 3B associated with operator B (and a mobile telephone 3C associated with the virtual network operator 2C) are able to connect to the network via the shared base station 5 as though connecting through equipment provided by their own respective network operator.

In the telecommunication system 1 of FIG. 1, typically, the network operators will contract to be provided with a certain proportion of the resources available at the shared base station 5. Beneficially, each operator's (or tenant's) share of the base station's 5 resources (i.e. that operator's associated network slice) is governed by an appropriate service level agreement (SLA) between that tenant and the party operating the shared base station 5. Thus, in accordance with the applicable SLAs and corresponding network slices, the mobile telephones 3 associated with any of the network operators (e.g. operators A, B, and virtual operator 2C) that share the base station 5 can connect to the shared base station 5, as though that shared base station 5 was a base station belonging to the respective network operator (or virtual network operator).

It is noted that the RAN (base station) sharing employed in this system is thus significantly different to a 'roaming' mechanism in which a mobile telephone associated with a first network operator forms a connection via the network of a different service provider. Specifically, in a roaming situation, the connection with the mobile telephone is monitored and controlled by the visited network which then subsequently bills the home network of the mobile telephone (generally resulting in significantly increased cost to the end user). In contrast, the sharing of the radio access network, as in the current embodiment, is transparent to users of the network, and monitoring and control of connections is performed using standard mechanisms as though the mobile telephone was connected via the network operator's own RAN.

In this example, the shared base station 5 serves user equipment (such as mobile telephones) in its cell in accordance with a time division duplex (TDD) communication scheme and supports a number of different Uplink/Downlink (UL/DL) frame configurations (representing which sub-frames are reserved for uplink communication, for downlink communication, or to be 'special' sub-frames) which may be dynamically configured in order to match (and/or to follow any changes in) traffic demands in the base station's cell. Such UL/DL frame configurations for time division LTE networks are disclosed in e.g. 3GPP TS 36.300 V13.1.0, although the UL/DL frame configurations employed by the shared base station 5 are not limited thereto. The UL/DL configurations can thus be configured (or reconfigured) to satisfy the service demands of aggregated traffic within a particular cell. Beneficially, however, the system 1 of this example is able to support service-oriented traffic dynamics in which 'slices' representing different UL/DL ratios to be configured (and reconfigured) dynamically for different traffic types. Specifically, the shared base station 5 can be configured (or reconfigured) to satisfy the service demands of individual types of traffic via appropriately configured service-oriented network slices. This contrasts with systems in which UL/DL frame configurations can only be configured to satisfy the service demands of aggregated traffic at a cell-oriented level rather than at a service-oriented level.

In more detail, the service-oriented capability is achieved in the shared base station 5 through isolation of different network slices belonging to different services/tenants (e.g. by appropriate network virtualization and/or the like). Using such isolation/virtualization, each network slice can be tailored to match the demands of its associated service/tenant (e.g. operators/virtual operators, MVNOs, OTT providers, and/or the like).

Thus, network slicing in this system is beneficially employed in order to allow each network slice to support a different UL/DL ratio (if appropriate) over its associated subcarrier(s) and by employing independent scheduling for each network slice, thereby making it possible to follow the service-oriented traffic dynamics more appropriately.

Beneficially, when a particular network slice is being set up or re-configured (e.g. for a particular traffic type and/or for a particular tenant), the system ensures that the network slice adopts an appropriate UL/DL rate for that traffic type/tenant.

In more detail, when a network slice is to be set up (or re-configured) for a tenant (e.g. in order to support an associated mobile telephone 3/service), the tenant's network management system (e.g. OAM&P entity 7 and/or the like) receives a request (for example, from the mobile telephone or the service provider) for setting up communication resources via the shared RAN (base station 5) to accommodate the radio bearer(s) associated with that network slice.

The network management system performs admission control based on a traffic prediction for that network slice/service. The network management system associates the SLA relating to the requested network slice to appropriate network resources (e.g. one or more subcarriers provided at the shared base station 5) and selects an appropriate UL/DL configuration ratio for that network slice (independently from any UL/DL configuration ratio employed for other network slices/subcarriers).

The network management system instantiates the network slice at the shared base station 5 (e.g. by communicating directly with the base station 5 or via an appropriate RAN hypervisor function and/or the like) in order to assure appropriate resource isolation and allocation of the required amount of network resources to that particular network slice. The network management system also informs the shared base station about the selected UL/DL configuration ratio for that network slice. It will be appreciated that communication between the network management system and the shared base station 5 (or its hypervisor function) may be carried out over the so-called 'Itf-N' interface as specified in 3GPP TS 32.130 V13.0.0.

Once the shared base station 5 has been configured to support a particular tenant (and any associated mobile telephone 3) via the corresponding network slice, the base station 5 schedules the traffic/subcarrier(s) associated with that tenant/mobile telephone based on the TDD configuration pattern applicable for that network slice. Specifically, the base station 5 is configured to use a cell specific dynamic UL/DL reconfiguration or a TDD eIMTA scheme for adapting the UL/DL frame configuration of that network slice to match the UL/DL traffic demands within the base station's 5 cell. Beneficially, therefore, the base station 5 is able to apply appropriate QoS and congestion control to each traffic type and for each tenant (in its associated network slice) independently from the configuration (UL/DL frames, QoS, congestion control, etc.) applicable to other tenants/services (in other network slices) in the same cell.

The isolation/network virtualization at the shared base station 5 ensures that variation in the traffic load of a particular network slice will not adversely affect the performance of other network slices. Accordingly, QoS/QoE may be improved (or maintained at the desired level) in each slice although at the cost of a potential loss of multiplexing gain. However, by selecting an UL/DL ratio per network slice that is appropriate for the service(s) provided via that network slice, it is possible to compensate for such loss of multiplexing gain (if any) and thereby enhance the overall resource utilization efficiency. It is therefore possible to control network congestion, and enable support for diverse services even when these services exhibit conflicting QoS requirements.

Beneficially, the system of this example may be made compliant with either one or both of the two fundamental 3GPP network sharing architectures (MOCN and GWCN) specified in 3GPP TS 23.251.

In a particularly beneficial variation to/enhancement of the above example, the dedicated network slices (with independent scheduling capabilities) are configured for pre-determined time durations (e.g. based on traffic predictions and/or SLA parameters) in order to match the requirements of specific services and/or tenants for the duration of a definite time period (e.g. measured in sub-frames, seconds, and/or the like). In this case, the network management system (and/or the shared base station 5) is configured to obtain, e.g. periodically, information relating to network performance (for example, QoE feedback and/or the like) from the nodes associated with a particular network slice (e.g. shared base station 5, mobile telephones 3, MME, gateways, AS, etc.). The network management system (and/or the shared base station 5) is also configured to match the traffic requirements in each network slice by dynamically adapting the UL/DL directions of the associated TDD sub-frames based on the information relating to network performance. For example, the network management system (or the shared base station 5 itself) may be configured to select, for each network slice and for an appropriate duration, at least one of: an UL/DL frame configuration; an appropriate reconfiguration timescale; a spectrum (subcarrier or group of subcarriers) in dependence on the obtained information relating to network performance (and/or any SLA parameters) for that particular network slice.

Accordingly, besides the aforementioned benefits, such dynamic UL/DL ratio within each network slice may ensure that any losses in multiplexing gain (that may arise e.g. due to decreasing diversity gains in each slice) can be avoided or kept to the minimum.

It will be appreciated that examples described herein may potentially contribute to avoiding the need to install separate networks in the same area adopting different operation parameters for each operator/tenant/service.

By employing network slicing, resources can be isolated for each network slice and it is possible to employ distinct configuration and operational parameters, e.g. UL/DL ratios and/or the like.

Each network slice may be configured with its own UL/DL ratio and/or re-configuration time scale that best matches its associated service level agreement.

The network management system and/or the shared base station have the potential to select spectrum resources that better satisfy the SLA of a particular service and/or application.

The desired SLA for a particular service or application may be maintained by employing an appropriate SLA assessment function that provides feedback to the network management system for adjusting the configuration of the associated network slice (e.g. UL/DL frame configuration, amount of resources, allocated subcarriers, and/or the like).

The method may be applied for allocating network slices to certain services/applications of a single mobile operator, thereby providing isolation of resources for services/applications of the same operator and thus provide better support for services/applications with different (conflicting) QoS requirements.

In case of a multi-tenant scenario, network slices may be allocated to vertical market players and/or MVNOs in a convenient and backward compatible way (and the allocation of network slices may be based on traffic prediction and/or applicable SLA parameters).

Mobile telephone

Figure 2:
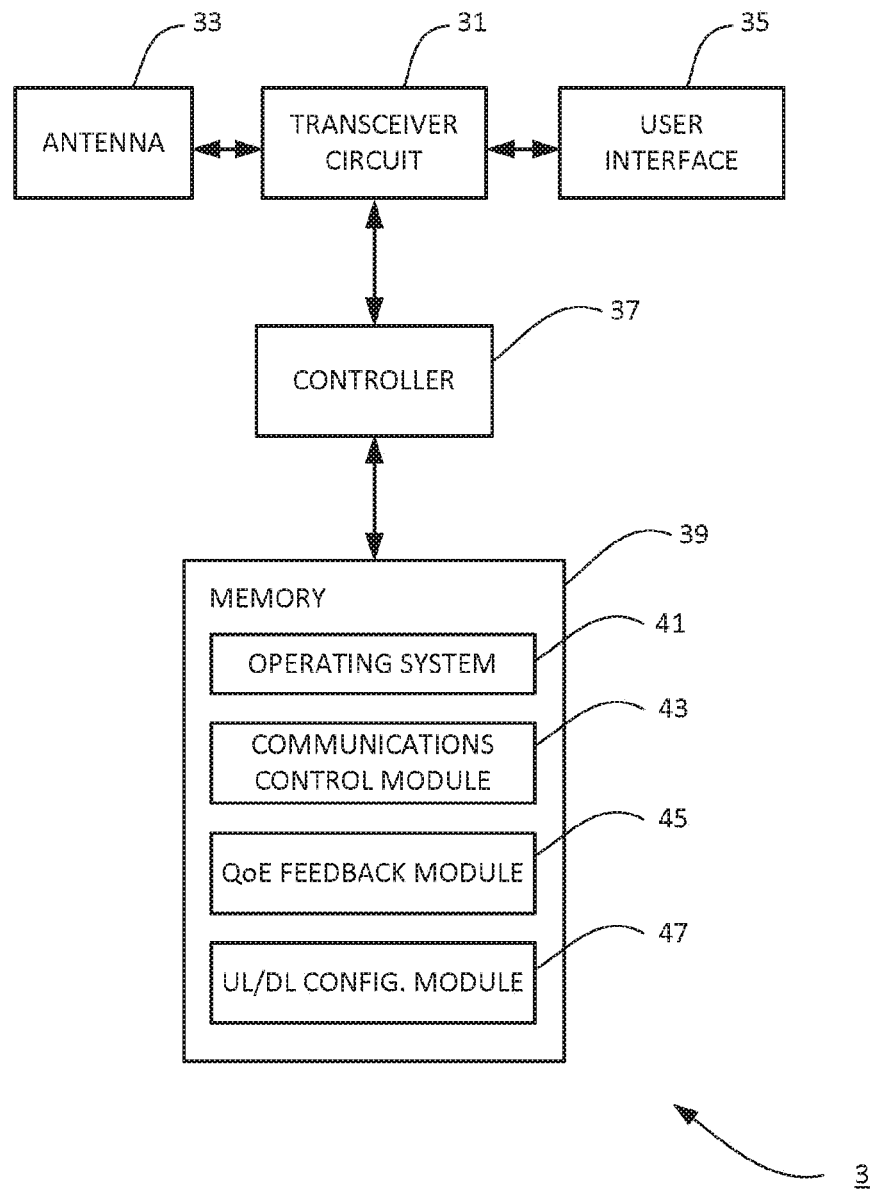
FIG. 2 is a block diagram of a mobile telephone suitable for use in the telecommunications system of FIG. 1.

FIG. 2 is a block diagram illustrating the main components of the mobile telephone 3 shown in FIG. 1. As shown, the mobile telephone 3 has a transceiver circuit 31 that is operable to transmit signals to and to receive signals from a base station 4, 5 via one or more antenna 33. The mobile telephone 3 may have all the usual functionality of a conventional mobile telephone (such as a user interface 35) and this may be provided by any one or any combination of hardware, software and firmware, as appropriate. The mobile telephone 3 has a controller 37 to control the operation of the mobile telephone 3. The controller 37 is associated with a memory 39 and is coupled to the transceiver circuit 31. Software may be pre-installed in the memory 39 and/or may be downloaded via the telecommunications network or from a removable data storage device (RMD), for example.

The controller 37 is configured to control overall operation of the mobile telephone 3 by, in this example, program instructions or software instructions stored within memory 39. As shown, these software instructions include, among other things, an operating system 41, a communications control module 43, a QoE feedback module 45, and an uplink/downlink configuration module 47.

The communications control module 43 is operable to control the communication between the mobile telephone 3 and the base stations 4, 5. The communications control module 43 also controls the separate flows of uplink data and control data that are to be transmitted to the base station 4, 5.

The QoE feedback module 45 is responsible for handling (receiving, generating, and sending) signalling messages relating the provision of a QoE feedback to the serving base station 4, 5 and/or the network management entity (via the base station). Such QoE feedback may relate to the uplink/downlink communications for the mobile telephone 3 carried out using one or more network slices.

The uplink/downlink configuration module 47 is responsible for obtaining (e.g. via appropriate signalling messages and/or system broadcast) and store the appropriate UL/DL configuration for each network slice used (or available for use) by the mobile telephone 3.

Shared Base Station (eNB)

Figure 3:
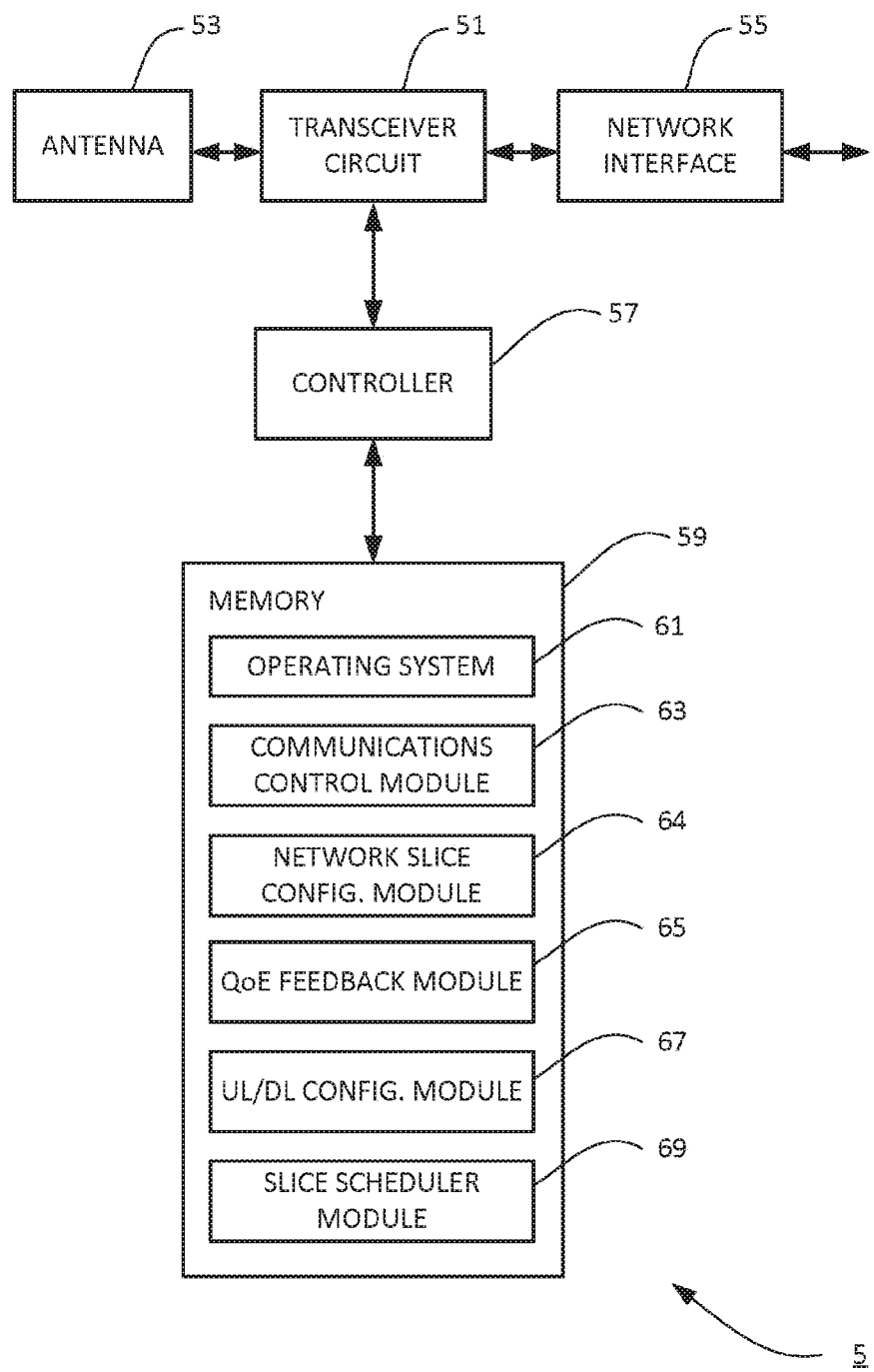
FIG. 3 is a block diagram of a shared base station suitable for use in the telecommunications system of FIG. 1.

FIG. 3 is a block diagram illustrating the main components of the shared base station 5 shown in FIG. 1. As shown, the shared base station 5 includes transceiver circuitry 51 which is operable to transmit signals to and to receive signals from the mobile telephones 3 via one or more antennae 53 and which is operable to transmit signals to and to receive signals from the core networks 2 and/or other base stations 4 via a network interface 55. The network interface typically includes an S1 interface for communicating with the core networks 2 and an X2 interface for communicating with other base stations. A controller 57 controls the operation of the transceiver circuitry 51 in accordance with software stored in memory 59. The software includes, among other things, an operating system 61, a communications control module 63, an network slice configuration module 64, a QoE feedback module 65, an uplink/downlink configuration module 67, and a slice scheduler module 69.

The communications control module 63 is operable to control the communication between the shared base station 5 and the mobile telephones 3 and other network entities that are connected to the base station 5. The communications control module 63 also controls the separate flows of uplink and downlink user traffic and control data to be transmitted to the communications devices served by the shared base station 5 including, for example, control data for managing operation of the mobile telephones 3.

The network slice configuration module 64 is operable to store and manage configuration data for defining, for each service/tenant, the respective proportion of resources (network slice) of the (shared) resources available via the base station 5.

The QoE feedback module 65 is responsible for obtaining QoE feedback (e.g. from the mobile telephone(s) 3 served by the base station 5 and/or other nodes) and for providing such QoE feedback to the network management node (if appropriate). The QoE feedback may relate to the uplink/downlink communications carried out using one or more network slices. The QoE feedback is used in the assessment of QoE associated with network slices.

The uplink/downlink configuration module 67 is responsible for managing and providing, to mobile telephones 3 served by the base station 5, configuration data defining the appropriate UL/DL configuration for each network slice provided via the base station 5. Such configuration data may be provided e.g. via appropriate signalling messages and/or system broadcast.

The slice scheduler module 69 is operable to allocate physical resource blocks for communication bearers or users belonging to each network slice based on within the available frequency resources (subcarriers) for that network slice (as defined by the configuration data held by the network slice configuration module 64).

Network Management Entity

Figure 4:
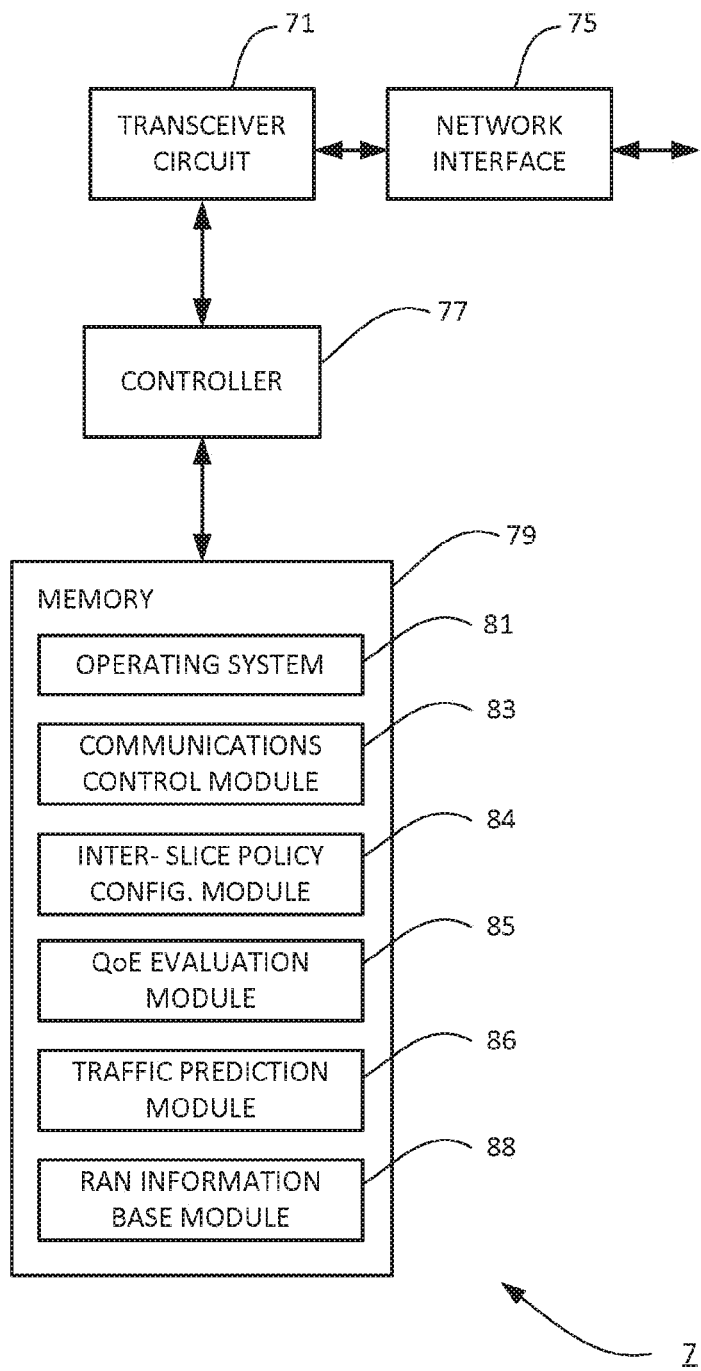
FIG. 4 is a block diagram of a network management entity suitable for use in the telecommunications system of FIG. 1.

FIG. 4 is a block diagram illustrating the main components of a network management entity, such as the OAM&P entity 7 shown in FIG. 1. As shown, the network management entity includes transceiver circuitry 71 which is operable to transmit signals to and to receive signals from the base stations 4, 5 and/or other nodes (e.g. RAN hypervisor function) via a network interface 75. A controller 77 controls the operation of the transceiver circuitry 71 in accordance with software stored in memory 79. The software includes, among other things, an operating system 81, a communications control module 83, an inter-slice policy configurator module 84, a QoE evaluation module 85, a traffic prediction module 86, and a RAN information database module 88.

The communications control module 83 is operable to control the communication between the network management entity and other network entities that are connected to the network management entity. Such communication may relate to, for example, the setting up and management of network slices.

The inter-slice policy configurator module 84 is responsible for configuring and adjusting network resources in accordance with the SLA of a particular network slice. The inter-slice policy configurator module 84 generates and sends, towards the shared base station 5, an appropriately formatted request based on e.g. information obtained from the traffic prediction module 86 and/or the QoE evaluation module 85. In addition, the inter-slice policy configurator module 84 is responsible for selecting the appropriate UL/DL frame configuration for each network slice, as well as for determining an appropriate re-configuration period (if applicable) and/or traffic prioritization and policy enforcement per network slice. In doing so, the inter-slice policy configurator module 84 may communicate with an appropriate core network node, such as a Policy and Charging Rules Function (PCRF), a Policy Control Enforcement Function (PCEF), or an Online Charging System (OCS) in order to obtain and comply with the corresponding subscriber's policies.

The QoE evaluation module 85 is responsible for analysing and assessing the performance of particular applications based on collected performance information (e.g. from the shared base station/RAN).

The traffic prediction module 86 is responsible for forecasting the traffic demands of network slices and/or a load associated with individual applications/services (e.g. a required and/or an actual load). The traffic prediction module 86 may carry out such forecasting, for example, based on an aggregated traffic load in the network (e.g. per operator/per service). The traffic prediction module 86 may be configured to carry out the forecasting upon request (e.g. by the shared base station 5 or by a server/user equipment involved in a service or associated with a network slice) and/or periodically (e.g. at regular/predetermined time intervals).

The RAN information database module 88 is responsible for storing and maintaining information relating to the load of the shared RAN (shared base station 5), associated interference and/or other key performance indicators such as handover failures, throughput, and/or the like.

In the above description, the mobile telephone, the shared base station, and the network management entity are described for ease of understanding as having a number of discrete modules (such as the communications control modules, the uplink/downlink configuration modules, and the QoE feedback/QoE evaluation modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

Resource Allocation Scenarios

Before providing a more detailed description of embodiments of the invention, a brief overview is given of exemplary resource allocation scenarios that may be realised in the telecommunications system 1 of FIG. 1.

In the telecommunication system 1 of FIG. 1, the network operators will contract to be provided with a certain proportion (reserved proportion) of the resources available at the shared base station 5. A group of communication bearers authorised to use the reserved proportion of the available resources associated with a particular operator is referred to as that operator's 'slice'.

Data is communicated between the base stations 4, 5 and user equipment using radio frames (typically of 10 ms duration in LTE) comprising a number (typically ten) sub-frames. In the frequency domain each slot is divided into frequency resource blocks each comprising a plurality (typically twelve in LTE) subcarriers. Within each slot, therefore, resources can be allocated to user equipment using units of frequency referred to as physical resource blocks (PRBs), each of which represents the smallest unit of resources that can be allocated to any user equipment 3 transmitting/ receiving data over the air interface. When a particular communication instance is first initiated for a particular piece of user equipment 3 a communication bearer is set up, from the user equipment 3, for guiding the data being communicated through the network. Sufficient resources (e.g. PRBs) are allocated to the communication bearer, by the base station 4, 5 to enable successful communication.

Table 1 illustrates some possible UL/DL frame configurations that can be used in TD-LTE networks for dynamically re-configuring the UL/DL ratio in a cell in accordance with evolving traffic conditions (although it will be appreciated that other configurations may also be used). This frame re-configuration scheme is referred to as cell specific dynamic UL/DL reconfiguration or (using 3GPP terminology) TDD enhanced Interference Management and Traffic Adaptation (eIMTA). Further details of eIMTA may be found in 3GPP TS 36.300 V13.1.0.

TABLE 1

TD-LTE uplink-downlink allocations
Sub-frame Number

| UL/DL Config | 0 | 1 | 2 | 3 | 4 | 5 | 6 | 7 | 8 | 9 |
|---|---|---|---|---|---|---|---|---|---|---|
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

Source: 3GPP TS 36.300 V13.1.0

Figure 5:
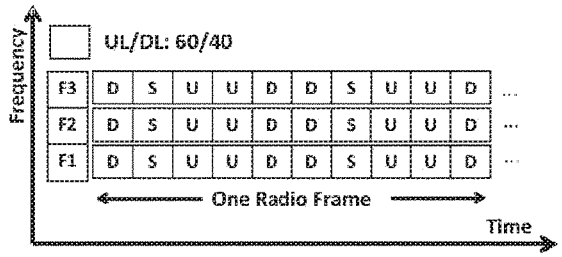
FIG. 5 illustrates exemplary frame configuration scenarios.
Figure 5:
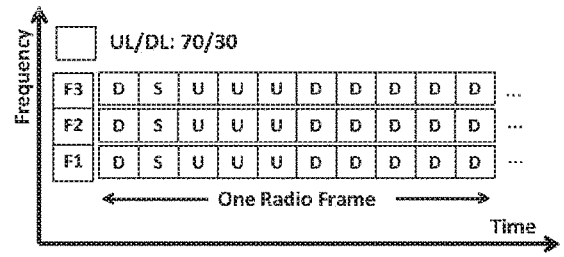
Figure 5:
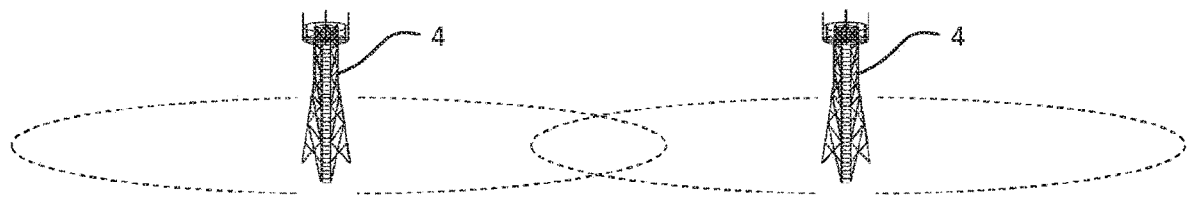
Figure 5:
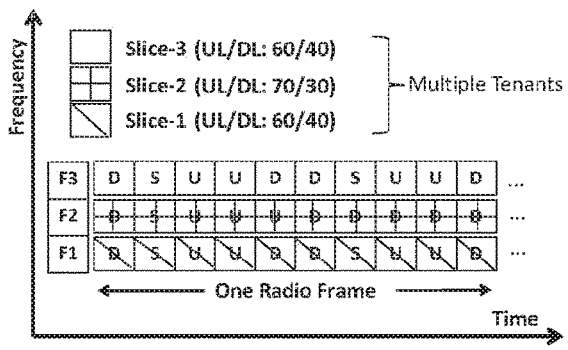
Figure 5:
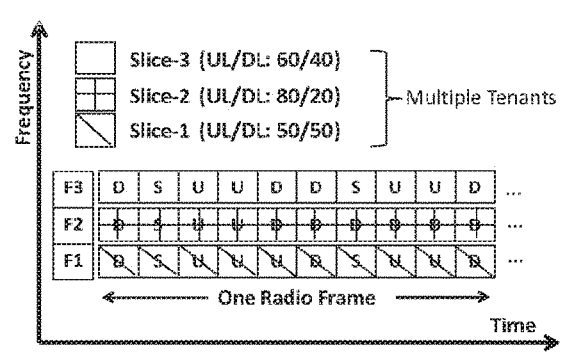
Figure 5:
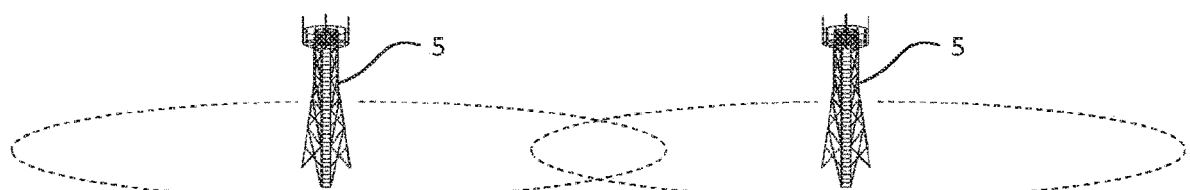

FIG. 5 illustrates four exemplary resource allocation scenarios, denoted options A to D. It will be appreciated that whilst three subcarriers (denoted 'F1', 'F2', and F3, respectively) are shown for illustration purposes, the number of (shared) subcarriers (or frequency bands) is not limited to three.

In more detail, options A and B show resource allocation scenarios in which the ratio of downlink resources (subframes) to uplink resources in each subcarrier F1 to F3 is the same. Specifically, the UL/DL ratio is 60/40 in the example denoted option A, and the UL/DL ratio is 70/30 in option B.

Beneficially, the scenarios shown in options A and B conform to the currently approved requirements of 3GPP TS 36.300 V13.1.0, which specifies that neighbouring base stations can adopt a different UL/DL ratio in their respective cells, but each base station is required to employ the same UL/DL ratio across a range of subcarrier group (e.g. a group consisting of subcarriers F1, F2, and F3 in options A and B). For example, base station 4A may be configured to use the UL/DL ratio shown in option A and base station 4B may be configured to use the UL/DL ratio shown in option B.

However, in options C and D, each subcarrier F1, F2, and F3 represents a different network slice allocated to a different service and/or tenant, and each subcarrier F1, F2, and F3 may be configured independently, i.e. to support its own associated UL/DL ratio. In this case, in order to avoid or minimise the risk of increasing the cross-slot interference among users served by different network slices (i.e. interslice users) the same subcarriers may be allocated to the same network slice (e.g. across the entire RAN or a specific part of the RAN). Beneficially, the utilization of such distinct frequencies for each network slice ensures isolation which contributes to the reduction of inter-slice interference. Alternatively, or additionally, advanced power control and/or almost blank sub-frame schemes may also be employed in order to make sure that inter-slice interference is minimized, when the size of slices is not the same as mentioned above.

Beneficially, the invention allows flexibility in managing network resources, e.g. UL/DL ratio, for each network slice and for each associated application/service.

It will be appreciated that such customized, independently configured network slices may be established per service or per application when considering a single mobile network operator (e.g. when the base station is not configured as a shared base station). However, customized network slices may also be established per tenant (per network operator and/or the like) when the base station is configured as a shared base station, in which case various network slices may be allocated/managed for the participating tenants.

Figure 6A:
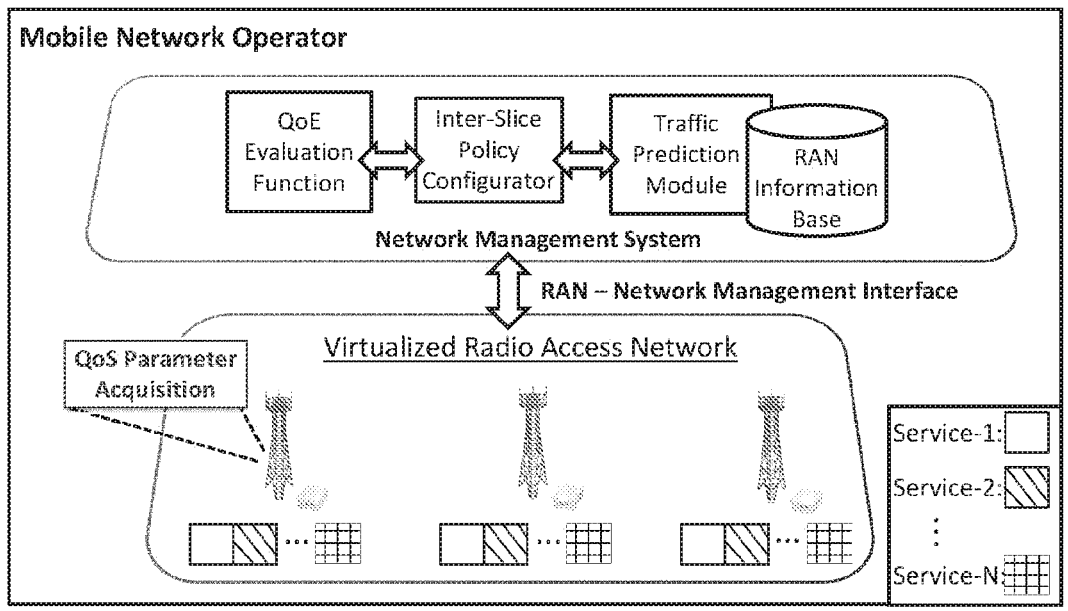
FIGS. 6a and 6b illustrate exemplary network elements and functions in various network configurations for which the invention is applicable.
Figure 6B:
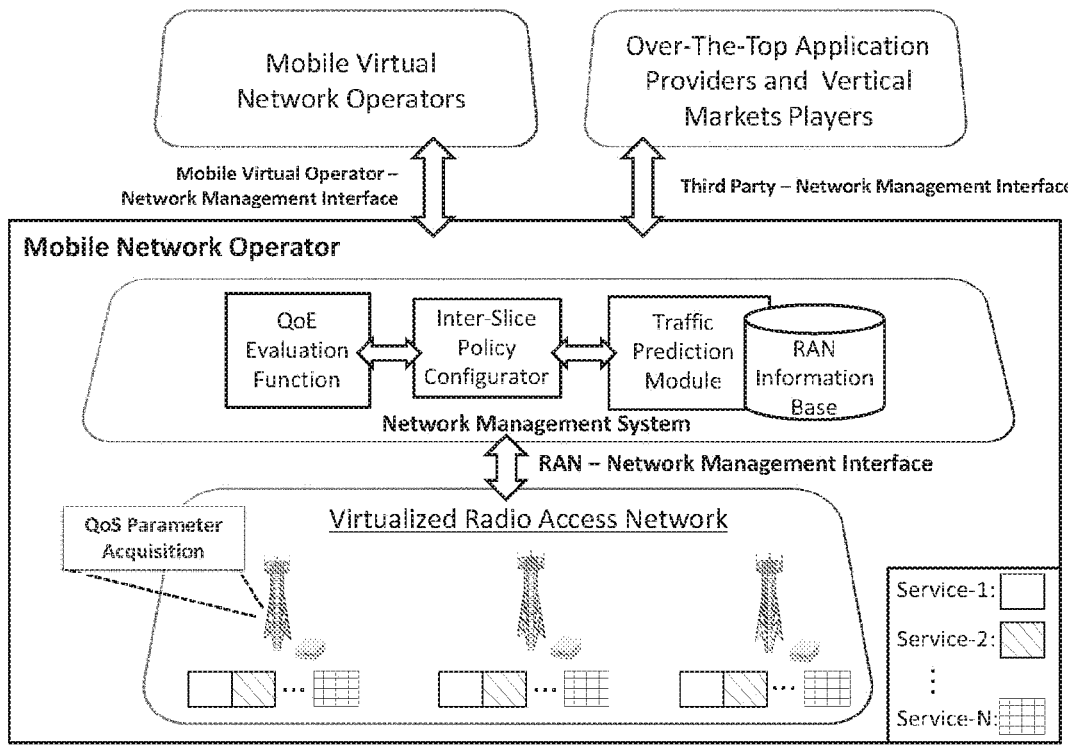

FIGS. 6a and 6b illustrate exemplary network configurations for which the invention is applicable. Specifically, FIG. 6a illustrates a network management architecture for a single operator scenario and FIG. 6b illustrates a network management architecture for a multi-tenant scenario.

It will be appreciated that the network management system shown in FIGS. 6a and 6b may be realised as a 3GPP OAM&P system (which may optionally include a capacity broker element). In this case the interface between the RAN (shared base station 5) and the network management system may be the 3GPP 'Itf-N' interface. The QoS parameter acquisition/evaluation may be provided as a Self-Organized Network (SON) function that is configured to report to the OAM&P entity 7. The OAM&P entity 7 in this case is configured to control the specific QoS monitoring parameters for the shared base station 5, including the timing of reporting, applicable thresholds for reporting, and/or the like.

Alternatively, the network management system may be realised as a software-defined network (SDN) controller that interacts with the virtualized RAN via the so-called 'Northbound-API' or 'D-CPI', collecting QoS information via a set of QoS parameter acquisition rules installed at the shared base station(s).

In the scenario shown in FIG. 6b, a single operator allocates network slices to other tenants, such as MVNOs, OTT application providers and other vertical market players based on the requested SLA. As can be seen, the MVNOs and other third parties can communicate with the network manager system, i.e. the OAM&P entity 7 of the infrastructure provider to request SLA for a particular service and/or to receive network management information regarding the traffic associated with their respective network slice.

As shown, communication between the network management system (OAM&P entity 7) and the tenants may be realised via the following interfaces:

A 'Mobile virtual operator—Network manager interface' connecting MVNOs with the infrastructure provider. In legacy 3GPP systems this interface is simply referred to as the 'Type 5' interface, which is used for exchanging management information between management systems of different mobile network operators and/or for roaming purposes. Further details of the Type 5 interface may be found in in 3GPP TS 32.130 V13.0.0. Alternatively, in case of SDN, this interface may be the Northbound-API or the A-CPI.

A 'Third party—Network manager interface' connecting OTT providers and vertical market players with the infrastructure provider. In legacy 3GPP systems this interface also carries out authentication procedures and enables network abstraction and information exchange via an appropriate application program interface (API) of the SCEF (e.g. an Open Mobile Alliance (OMA) or Open GSM Association (GSMA) API). Alternatively, in case of SDN, this interface may be the Northbound-API or the A-CPI.

Using either architecture, the infrastructure provider is able to obtain information relating to the QoS required for a particular network slice from network management system (e.g. the traffic prediction module 86). Such information may relate to e.g. traffic prediction/forecasting (per slice and/or aggregate load in the RAN), which may be based on a global network view using information available at the RAN information base module 88.

Furthermore, once a network slice request is admitted, the network management system is able to configure (or re-configure, if appropriate) the network slice in terms of its network resources, UL/DL configuration, re-configuration timescale, etc. via the RAN—network management interface.

Operation

A more detailed description will now be given of the scenario discussed above where network slicing is used for supporting different UL/DL ratios for different tenants/services with independent scheduling.

Figure 7:
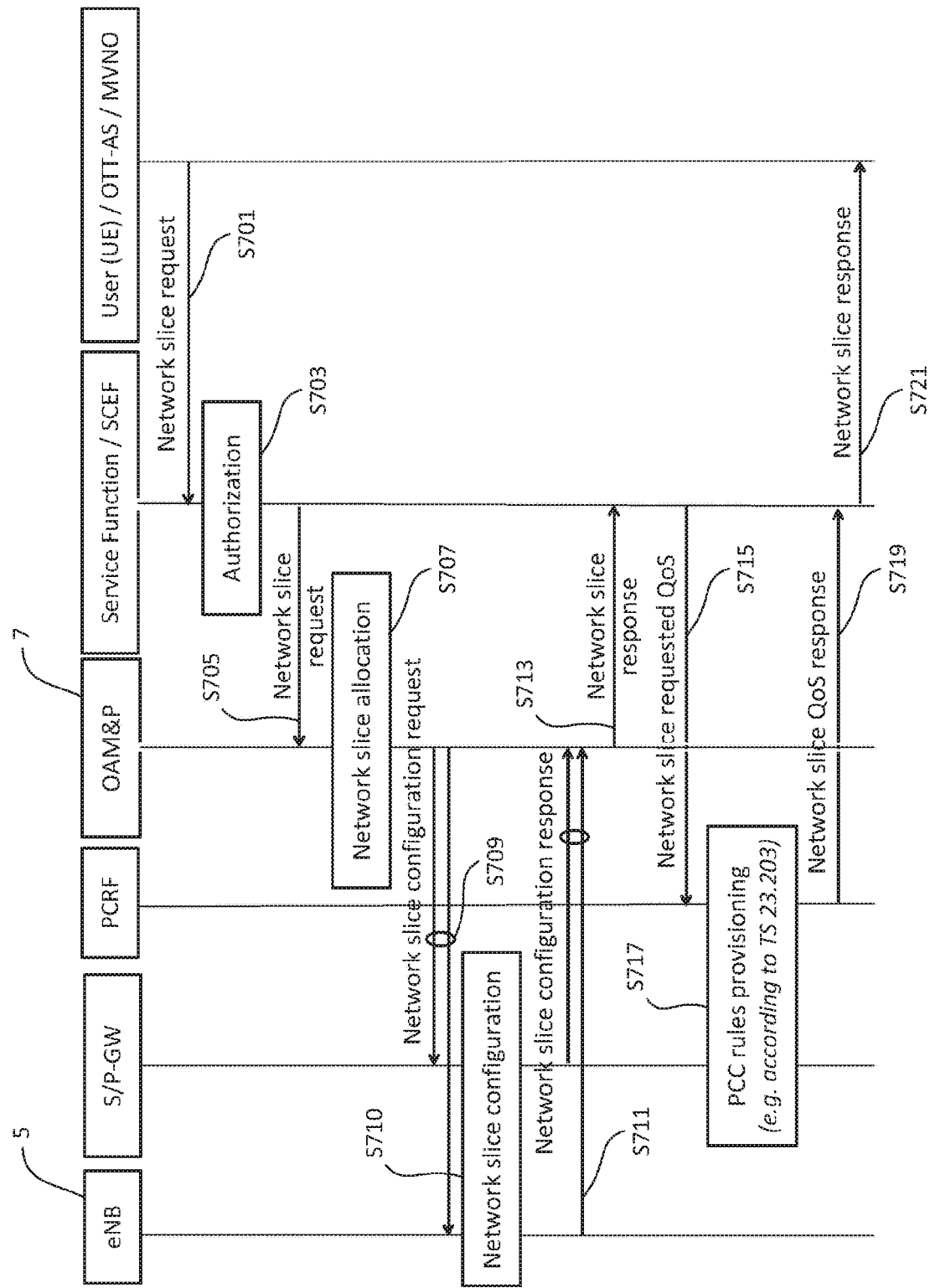
FIG. 7 is an exemplary timing (signalling) diagram illustrating a method for configuring network slices in the telecommunications network of FIG. 1 and FIGS. 6a and 6b.

FIG. 7 is a timing diagram illustrating a call flow for setting up a (service-oriented) network slice for service provision in the telecommunications network 1 of FIG. 1 (with multi-tenant support). It will be appreciated that this method is applicable to both exemplary scenarios illustrated in FIGS. 6a and 6b.

As can be seen, the procedure begins in step S701, in which a user (e.g. a user of the mobile telephone 3 being a subscriber to a particular service/operator) requests a service by sending an appropriately formatted signalling message to a service function (e.g. an application server, SCEF, and/or the like) associated with the user's network operator. Alternatively, the service may be requested on behalf of the user, e.g. by an appropriate service triggering entity such as an OTT application server (OTT-AS) or an MVNO that the user is a subscriber to. Effectively, the message to the service function serves as a request for setting up a network slice and associated communication bearers for the provision of that service to one or more mobile telephones. The request includes information identifying a desired SLA (QoS), timing information, duration, etc.

In step S703, the service function (application server/SCEF) performs an Authorization, Authentication and Accounting (AAA) procedure for the received network slice request, as appropriate under 3GPP procedures. If the authorization fails (e.g. the requested service is not allowed for this subscriber), then the service function proceeds to step S721 and notifies the sender of the request about the failure by generating and sending an appropriate response (including an appropriate failure cause, e.g. 'not authorised').

If the authorization is successful (e.g. the requested service is allowed/available for this subscriber), then the service function proceeds to step S705 and forwards the network slice request towards the 3GPP network management system (in this example, the OAM&P entity 7).

In step S707, the network management system analyses the desired SLA (e.g. using the traffic prediction module 86 and/or the RAN information database 88) and performs admission control before allocating network slice resources to accommodate the request. The network management system consults the traffic prediction module 86 to ensure that the inquired resources are available for the specified time duration. The network management system converts (using its inter-slice policy configurator module 84) the requested SLA to network slice related policy, including determining an appropriate TDD UL/DL ratio (and frame reconfiguration timescale, if applicable).

Next, as generally shown in step S709, the network management system notifies the nodes of the shared RAN (in this example the base station 5) and the nodes of the relevant core network 2 (in this example the serving and PDN gateways) regarding the configuration of the networks slice request (specifying the amount of network resources, UL/DL configuration, the re-configuration timescale, etc.). The network management system may notify the RAN/core network nodes either directly or via an appropriate hypervisor entity (and/or the like).

As generally shown in step S710, the RAN and core network nodes perform an appropriate allocation of resources in accordance with the received network slice configuration and assuring isolation between different network slices.

Once the network slice configuration is performed successfully, the (multi-service or shared) base station 5 and the gateways inform the network management system (OAM&P entity 7) about this by generating and sending, in step S711, an appropriate network slice configuration response message. Otherwise, if the network slice configuration is not successful, the messages sent in step S711 may comprise appropriate network slice configuration failure messages (including a failure reason).

In step S713, the network management system provides a network slice response back the service function to inform the service function about the admission control status of the service requested in step S705.

In response to this, upon a positive admission control, the service function generates and sends, in step S715, an appropriate signalling message to the PCRF and includes in this message the corresponding policy details that accompany the granted request (e.g. an SLA/QoS requested for the network slice being set up). Such policy details are applicable to each user communicating using that particular network slice.

Based on the received policy details, the PCRF derives, in step S717, the corresponding QoS and generates applicable Policy and Charging Control (PCC) rules for the service (as described in 3GPP TS 23.203 V13.6.0) and provides the PCC rules to the gateways used for the service. The PCC rules are then enforced at the gateways for data traffic by any user (of the given service) communicating using that particular network slice.

The PCRF also notifies the service function that the network slice policy configuration was successful by generating and sending, in step S719, an appropriate Network slice QoS response.

In step S721, the service function notifies the party initiating the network slice request procedure (e.g. the user, the OTT-AS, or the MVNO) regarding the admission control status of the network slice request.

Thus, after successful completion of the network slice request procedure, the mobile telephone 3 (and/or the application server/MVNO) can start using the allocated network slice resources for the requested service.

QoE Assessment and UL/DL (Re-)Configuration

As explained above, the first step in setting up a network slice is to assign an appropriate network resource and then select an appropriate UL/DL configuration and re-configuration timescale (if any). Once the network slice has been created, the associated traffic load is monitored at regular time intervals in order to perform necessary adjustments, such as resizing the network slice (by changing the number of allocated subcarriers) depending on evolving UL/DL traffic demands, QoE/QoS and radio conditions, and/or the like.

In order to achieve this, a QoE assessment function is provided as part of the network management system (e.g. OAM&P entity 7), which is responsible for evaluating the performance of specific applications and/or services by considering associated QoS information. The QoE assessment function relies on a QoS parameter acquisition mechanism, which is adapted to collect application specific QoS information, e.g. delay, loss, throughput, etc from the base station 5 and/or the mobile telephones 3. Such application specific QoS information is used by the QoE assessment function in reconfiguring the network slices, if appropriate (e.g. by changing an associated UL/DL configuration and/or the like).

Besides impacting inter-slice resource allocation, the QoE assessment function may also influence one or more of:
  (i) the UL/DL configuration selection (e.g. based on the standard configurations shown in Table 1 or based on a customised TDD frame configuration scheme);
  (ii) the reconfiguration timescale applicable to a particular network slice; and
  (iii) the selection of the corresponding spectrum, e.g. Resource Blocks (RBs), for particular services and/or tenants.

Since network traffic load and interference conditions are varying and may fluctuate due to user mobility, the QoE assessment function also takes into account the end-user's (e.g. mobile telephone 3) geographic location and/or an associated application usage pattern in re-configuration of the UL/DL ratio for individual slices.

It will be appreciated that the QoE assessment function may be instantiated by appropriate communication between the network management system and the shared (or multi-service) RAN. For example, QoE assessment may be triggered at step S709 (described above with reference to FIG. 7) together with the provision of slice configuration parameters to the RAN. Upon a change in the QoS associated with a network slice, the base station 5 (or its hypervisor function) may be configured to notify the OAM&P entity 7, which then proceeds to repeat steps S707-S7011 in order to make potential adjustments to the configuration of ongoing network slices.

It will be appreciated that the QoE assessment function may be performed by the base station 5 either in a distributed or a cell-specific manner. Each base station may therefore adjust the applicable UL/DL ratio(s) based on measurement reports from users (mobile telephones) in its cell(s) or provide information to the OAM&P to change the UL/DL ratios and/or other configuration parameters.

By performing these processes in a distributed manner it is possible to support more effectively any evolving short term traffic variation. However, since the base station 5 (or base stations) can establish a number of network slices, each such network slice having its own traffic demand, a centralized network management entity is provided for maintaining a logical network view and for gathering information relating to network performance. Such information relating to the network performance is then made available to the network management system (e.g. the RAN information base module 88) and may therefore be used during configuration of the network slices.

It will be appreciated that interference control is important, due to an additional source of interference between different network slices, resembling dense RAN deployment scenarios where interference and resource allocation is handled in a centralized manner. In order to address this issue, the following options are suggested:
  (i) a centralized approach for controlling UL/DL configuration, reconfiguration timescale and/or spectrum selection (in which case each shared or multi-service base station is controlled by a central controller node), or
  (ii) a hybrid approach in where each shared or multi-service base station is provisioned with appropriate policies for reacting to particular traffic and service performance conditions (in which case each base station may make appropriate adjustments to its own network slices without requiring further assistance from a central controller node).

In summary, embodiments of the present invention introduce dedicated service or application centric isolated network slices that take into account the desired Service Level Agreement (SLA) associated with that service or application.

Compared to conventional TDD systems where base stations are arranged to consider only the aggregate traffic situation in their cells and schedule each operator/service together, the described examples enable multi-service and/or multi-tenant support that may potentially result in improved flexibility of management of network resources, including, for example, configuring an appropriate UL/DL ratio for each network slice and achieving a more optimal QoS/QoE for each application or service (provided using a particular network slice).

Modifications and Alternatives

A number of detailed embodiments have been described above. As those skilled in the art will appreciate, a number of modifications and alternatives can be made to the above embodiments whilst still benefiting from the inventions embodied therein. By way of illustration only a number of these alternatives and modifications will now be described.

While the above described embodiments have been explained using the example of two network operators and a virtual network operator (and/or OTT providers and vertical players) sharing capacity at a base station, it will be appreciated that any number of network operators may share the RAN, and that the described embodiments are generally applicable to networks/base stations shared by at least two operators/tenants. Moreover, as explained above, the embodiments are also applicable to a single operator offering multiple isolated services via a base station/RAN (i.e. when an operator is not sharing the base station/RAN with other tenants).

It will be appreciated that instead of the term 'tenant' the term 'participating operator' may also be used.

It will be appreciated that the 'share' of a network slice (of the resources of the shared base station) is not necessarily a fixed quantity because it may depend on the resource usage of other network slices, according to the applicable sharing rules and/or service level agreements.

It will be appreciated that the establishment of a network slice may be performed on demand in accordance with the associated SLA parameters and with an associated time scale (such as a 'long' or 'short' time scale) and/or an associated starting time and (optionally) duration. The SLA parameters may include one or more of: a network capacity parameter, a delay parameter, a jitter parameter, a throughput parameter, a loss parameter, a parameter relating to a mobility profile associated with the user and/or service, and a parameter relating to a subscriber profile associated with the user.

By allocating the same subcarrier(s) to a particular network slice (e.g. across the shared RAN or across a part of the shared RAN), it may be possible to avoid increasing cross-slot interference among users served by different network slices (inter-slice users'). In other words, by utilising distinct frequencies and isolation of network slices, it may be possible to avoid and/or to reduce inter-slice interference. It will be appreciated that, alternatively or in addition to using distinct frequencies for each network slice, the shared base station may also be configured to employ advanced power control techniques and/or almost blank sub-frame schemes in order to manage such inter-slice interference.

In the above embodiments, the 3GPP OAM&P entity is described as an exemplary network management entity responsible for the configuration of network slices (e.g. QoE evaluation, inter-slice policy configuration, traffic prediction, storing RAN information, and interfacing with the shared RAN and other tenants). However, it will be appreciated that the functionalities of the network management entity may be provided by a different network node, and if appropriate, the functionalities of the network management entity may be spread across multiple network nodes.

In the procedure described above with reference to FIG. 7, a network slice request is sent (in step S701) towards an appropriate 3GPP network node (e.g. service function or SCEF). However, if an SDN architecture is used instead of a 3GPP one, then the network slice request may be sent towards an appropriate SDN controller (via the Northbound-API or A-CPI) instead of a service function or SCEF. In this case, the SDN controller may be configured to perform the corresponding admission control and network slice allocation procedures (steps S703-S707) and configure the RAN and core network elements (via the Southbound-API or D-CPI) including configuration of the associated policy rules and QoS assessment functionality (steps S709-S719).

It will be appreciated that each network slice (or requested network slice) may be classified whether or not to include asymmetric traffic application flows (e.g. significantly different respective amount of data on uplink and downlink). In this case, a dedicated dynamic TDD slice may be provided for asymmetric traffic (or for substantially symmetric traffic), while serving any remaining traffic via a single Frequency Division Duplex (FDD) slice.

In the above embodiments, a telecommunications system operating according to 3GPP standards was described. However, as those skilled in the art will appreciate, the techniques described in the present application can be employed in communications systems operating according to other standards, in particular any Orthogonal Frequency-Division Multiplexing (OFDM)-based system, such as the Worldwide Interoperability for Microwave Access (WiMAX) standard.

In the above embodiment, a mobile telephone based telecommunications system was described. As those skilled in the art will appreciate, the techniques described in the present application can be employed in any communications system. In the general case, the base stations and the mobile telephones can be considered as communications nodes or devices which communicate with each other. Other communications nodes or devices may include access points and user devices such as, for example, personal digital assistants, laptop computers, web browsers, and the like.

In the above embodiments, a number of software modules were described. As those skilled will appreciate, the software modules may be provided in compiled or un-compiled form and may be supplied to the base station as a signal over a computer network, or on a recording medium. Further, the functionality performed by part or all of this software may be performed using one or more dedicated hardware circuits. However, the use of software modules is preferred as it facilitates the updating of the base station in order to update its functionality. Similarly, although the above embodiments employed transceiver circuitry, at least some of the functionality of the transceiver circuitry can be performed by software.

Where the request is a first request for a first network slice, the receiver of the first communication apparatus may be configured to receive a further request for a further network slice for at least one further service, and the processor of the first communication apparatus may be configured to generate a further notification specifying, for the further network slice, at least one of a further UL/DL configuration and a further reconfiguration timescale specific to the further network slice. The further UL/DL configuration/further reconfiguration timescale specific to the further network slice may be different to the UL/DL configuration/further reconfiguration timescale for the first network slice. In this case, the receiver of the second communication apparatus may be configured to receive a further request for configuration of a further network slice, and the processor of the second communication apparatus may be configured to allocate at least one further resource for the further network slice, and wherein the at least one further resource for the further network slice is different to the at least one resource allocated for the first network slice.

The processor of the first communication apparatus may be configured to specify, for the or each network slice, a slice specific UL/DL configuration/reconfiguration timescale based on a respective service level agreement (SLA) for the at least one service associated with that network slice.

The processor of the first communication apparatus may be configured to obtain information relating to at least one of: traffic prediction; a service level agreement (SLA); and a quality of experience (QoE) for a particular network slice; and the processor may be configured to specify the at least one of an UL/DL configuration and a reconfiguration timescale in dependence on the obtained information. For example, the processor of the second communication apparatus may be configured to obtain information relating to a quality of experience (QoE) for a particular network slice; and the second communication apparatus may further comprise a transceiver for sending, to a communication apparatus from which said receiver received a request for configuration of that particular network slice, the information relating to a QoE for that particular network slice.

The at least one service may comprise a service associated with at least one of: a network operator; a virtual network operator; a service provider; an application server; an item of user equipment (UE); and an over-the-top provider. The at least one resource may comprise a TDD resource.

The receiver of the first communication apparatus may be configured to receive the request for a network slice via one of: a 3rd Generation Partnership (3GPP) interface (e.g. a 'Type 5' interface); an Open Mobile Alliance (OMA) interface; a GSM Association (GSMA) interface; and a software-defined network (SDN) interface (e.g. a 'Northbound-API' interface or an 'A-CPI' interface). The receiver of the second communication apparatus may be configured to receive the request for a network slice via one of: a 3rd Generation Partnership (3GPP) interface (e.g. an 'Itf-N' interface) and a software-defined network (SDN) interface (e.g. a 'Northbound-API' interface or an 'A-CPI' interface).

The processor of the second communication apparatus may be configured to configure a control entity (e.g. a hypervisor) for maintaining isolation between respective network slices set up for each of a plurality of different services.

The second communication apparatus may be a base station and/or a core network entity (e.g. a serving/packet data network gateway, 'S/P-GW').

Various other modifications will be apparent to those skilled in the art and will not be described in further detail here While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A communication apparatus for facilitating setting up of a network slice for service provision in a time division duplex system, the communication apparatus comprising:
   a receiver configured to receive a first request from a first network operator for a first network slice for at least one service and to receive a second request from a second network operator for a second network slice for at least one service;
   a processor configured to request from the first network operator a first traffic forecast and to request from the second network operator a second traffic forecast and to specify, for the requested first network slice, a first uplink/downlink (UL/DL) configuration and a first reconfiguration timescale for at least one radio bearer associated with the first network operator based on the first traffic forecast and to specify, for the requested second network slice, a second uplink/downlink (UL/DL) configuration and a second reconfiguration timescale for at least one radio bearer associated with the second network operator based on the second traffic forecast; and
   a transmitter configured to notify a communication entity of the first network operator of the first UL/DL configuration and the first reconfiguration timescale and to notify a communication entity of the second network operator of the second UL/DL configuration and the second reconfiguration timescale,
   wherein the processor instantiates the first network slice including the first uplink/downlink (UL/DL) configuration and the first reconfiguration timescale and the second network slice including the second uplink/downlink (UL/DL) configuration and the second reconfiguration timescale and the at least one resource used by the first network slice and the at least one resource used by the second network slice are isolated from each other.

2. The communication apparatus according to claim 1, wherein the first UL/DL configuration and first timescale are different from the second UL/DL configuration and the second reconfiguration timescale.

3. The communication apparatus according to claim 1, wherein the processor is configured to specify, for the first network slice, the first UL/DL configuration and the first reconfiguration timescale based on a respective service level agreement for the at least one service associated with the first network slice.

4. The communication apparatus according to claim 1, wherein the processor is configured to obtain information relating to at least one of: traffic prediction; a service level agreement; and a quality of experience for the first network slice; and wherein the processor is configured to specify the first UL/DL configuration and the first reconfiguration timescale in dependence on the obtained information.

5. The communication apparatus according to claim 1, wherein the at least one service comprises a service associated with at least one of: a network operator; a virtual network operator; a service provider; an application server; an item of user equipment; and an over-the-top provider.

6. The communication apparatus according to claim 1, wherein the receiver is configured to receive the request for a network slice via one of: a $3^{rd}$ Generation Partnership interface; an Open Mobile Alliance interface; a global system for mobile communications (GSM) Association interface; and a software-defined network interface.

7. A communication apparatus for facilitating setting up of a network slice for service provision in a time division duplex system, the communication apparatus comprising:
   a receiver configured to receive a first request from a first network operator for configuration of a first network slice, the first request comprising information identifying a first uplink/downlink (UL/DL) configuration specified for the network slice and to receive a second request from a second network operator for configuration of a second network slice, the second request comprising information identifying a second uplink/downlink (UL/DL) configuration specified for the network slice and to receive from the first network operator a first traffic forecast and to request from the second network operator a second traffic forecast; and
   a processor configured to allocate at least one resource for the first network slice based on the first traffic forecast and to allocate at least one resource for the second network slice based on the second traffic forecast, wherein at least one resource used by the first network slice and at least one resource used by the second network slice are isolated from each other.

8. The communication apparatus according to claim 7, wherein the processor is configured to configure a control entity for maintaining isolation between the first network slice and the second network slice.

9. The communication apparatus according to claim 7, wherein the communication apparatus is a base station.

10. The communication apparatus according to claim 7, wherein the communication apparatus is a core network entity.

11. The communication apparatus according to claim 7, wherein the receiver is configured to receive the request for a network slice via one of: a $3^{rd}$ Generation Partnership interface and a software-defined network interface.

12. The communication apparatus according to claim 7, wherein the at least one resource comprises a time division duplex resource.

13. The communication apparatus according to claim 7, wherein the processor is configured to obtain information relating to a quality of experience for the first network slice; and further comprising a transceiver for sending, to a communication apparatus from which the receiver received a request for configuration of the first network slice, the obtained information.

14. The communication apparatus according to claim 7, wherein the at least one resource includes a subcarrier as a frequency resource.

15. A method performed by a communication apparatus for facilitating setting up of a first network slice and a second network slice for service provision in a time division duplex system, the method comprising:
receiving a request from a first network operator for the first network slice for at least one service and a request from a second network operator for the second network slice for at least one service;
request from the first network operator a first traffic forecast and to request from the second network operator a second traffic forecast;
specifying, for the requested first network slice, a first uplink/downlink (UL/DL) configuration and a first reconfiguration timescale for at least one radio bearer associated with the first network operator based on the first traffic forecast and for the requested second network slice, a second uplink/downlink (UL/DL) configuration and a second reconfiguration timescale for at least one radio bearer associated with the second network operator based on the second traffic forecast; and
notifying at least one of a communication entity of the first network operator of the first UL/DL configuration and the first reconfiguration timescale and to notify a communication entity of the second network operator of the second UL/DL configuration and the second reconfiguration timescale,
instantiating the first network slice including the first uplink/downlink (UL/DL) configuration and the first reconfiguration timescale and instantiating the second network slice including the second uplink/downlink (UL/DL) configuration and the second reconfiguration timescale, wherein at least one resource used by the first network slice and at least one resource used by the second network slice are isolated from each other.

16. A tangible, non-transitory, computer-readable medium comprising computer implementable instructions for causing a programmable computer device to perform the method of claim 15.

17. A method performed by a communication apparatus for facilitating setting up of a first network slice and a second network slice for service provision in a time division duplex system, the method comprising:
receiving a request from a first network operator for configuration of the first network slice, the request comprising information identifying a first uplink/downlink (UL/DL) configuration specified for the first network slice;
receiving a request from a second network operator for configuration of the second network slice, the request comprising information identifying a second uplink/downlink (UL/DL) configuration specified for the second network slice;
receiving from the first network operator a first traffic forecast and to request from the second network operator a second traffic forecast;
allocating at least one resource for the first network slice based on the first traffic forecast; and
allocating at least one resource for the second network slice based on the second traffic forecast,
wherein at least one resource used by the first network slice and at least one resource used by the second network slice are isolated from each other.

18. A tangible, non-transitory, computer-readable medium comprising computer implementable instructions for causing a programmable computer device to perform the method of claim 17.

* * * * *